(12) United States Patent
Bealkowski

(10) Patent No.: US 6,697,905 B1
(45) Date of Patent: Feb. 24, 2004

(54) APPARATUS FOR PROVIDING I/O SUPPORT TO A COMPUTER SYSTEM AND METHOD OF USE THEREOF

(75) Inventor: Richard Bealkowski, Redmond, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,585

(22) Filed: Apr. 13, 2000

(51) Int. Cl.$^7$ .............................................. G06F 13/00
(52) U.S. Cl. ........................ 710/316; 710/38; 710/37; 709/226
(58) Field of Search ...................... 710/100, 300–304, 710/36–38, 305, 316–317; 361/681–686; 709/223–226

(56) References Cited

U.S. PATENT DOCUMENTS

| | | | |
|---|---|---|---|
| 5,193,174 A | | 3/1993 | Bealkowski et al. |
| 5,280,585 A | * | 1/1994 | Kochis et al. .............. 358/442 |
| 5,287,461 A | | 2/1994 | Moore |
| 5,307,462 A | * | 4/1994 | Hastings ...................... 710/10 |
| 5,337,229 A | * | 8/1994 | Holland et al. ............. 345/635 |
| 5,432,907 A | | 7/1995 | Picazo, Jr. et al. |
| 5,566,306 A | * | 10/1996 | Ishida ......................... 710/309 |
| 5,584,008 A | * | 12/1996 | Shimada et al. ............ 711/114 |
| 5,590,377 A | * | 12/1996 | Smith .......................... 710/22 |
| 5,680,536 A | * | 10/1997 | Tyuluman ...................... 714/1 |
| 5,712,975 A | * | 1/1998 | Ooe ............................ 709/219 |
| 5,907,689 A | | 5/1999 | Tavallaei et al. |
| 5,913,034 A | * | 6/1999 | Malcolm .................... 709/223 |
| 5,941,963 A | * | 8/1999 | Charles et al. ................ 710/2 |
| 6,073,188 A | * | 6/2000 | Fleming ..................... 710/316 |
| 6,098,138 A | * | 8/2000 | Martinelli et al. .......... 709/227 |
| 6,308,239 B1 | * | 10/2001 | Osakada et al. ............ 710/316 |
| 6,321,346 B1 | * | 11/2001 | Murotani et al. .............. 714/9 |
| 6,516,385 B1 | * | 2/2003 | Satoyama et al. .......... 711/112 |
| 6,567,876 B1 | * | 5/2003 | Stufflebeam ................ 710/303 |
| 2002/0099899 A1 | * | 7/2002 | Shaw .......................... 710/316 |
| 2002/0103951 A1 | * | 8/2002 | Huber et al. .................. 710/72 |
| 2002/0129136 A1 | * | 9/2002 | Matharu ..................... 709/223 |

* cited by examiner

Primary Examiner—Sumati Lefkowitz
(74) Attorney, Agent, or Firm—Sawyer Law Group; Martin McKinley

(57) ABSTRACT

An apparatus for providing I/O support to a computer system and a method of use thereof is disclosed. The apparatus in accordance with the present invention includes an internal control element located within the apparatus. The control element allows the apparatus in accordance with the present invention to relinquish ownership of the associated I/O devices for the purpose of being used by another computer. Accordingly, through the use of the apparatus in accordance with the present invention, expensive KVM switches and cabling, along with the accompanying I/O devices, are no longer needed to provide I/O support for computer networks. A first aspect of the present invention provides an apparatus for providing I/O support to a computer system. The apparatus comprises an I/O device and an internal control element coupled to the I/O device for relinquishing ownership of the I/O device from the apparatus to the computer network. A second aspect of the present invention provides a method for providing I/O support to a computer system. The method comprises the steps of providing an apparatus wherein the apparatus includes an I/O device and an internal control element coupled to the I/O device and utilizing the internal control element to allow ownership of the I/O device to be relinquished from the apparatus to the computer system.

44 Claims, 6 Drawing Sheets

APPARATUS FOR PROVIDING I/O SUPPORT TO A COMPUTER SYSTEM AND METHOD OF USE THEREOF

FIELD OF THE INVENTION

The present invention relates generally to computer systems and more particularly to an apparatus for providing input/output support to a computer system.

BACKGROUND OF THE INVENTION

FIG. 1 illustrates a conventional computer system 10. Computer system 10 typically includes the main computer system 12, a keyboard 14, a mouse 16, a display device or monitor 18, a diskette or floppy drive 20 and a compact disc (CD) or digital versatile disc (DVD) drive 22. It is understood that computer system 10 is for illustrative purposes and includes numerous components not shown.

Large installation computer networks typically incorporate racks of server computers (servers) to provide services to the other computers within the networks. The functions performed by each of these servers vary depending on the network and the server's place within the particular network. For example, at least one server typically functions as "file server" for the network. A computer functioning as a file server will usually have significantly more data storage capacity than the other computers connected to the network. The networked computers utilize this data storage capacity to store files and databases. Software executed by the file server controls access to these files and databases.

Typically, each server within each rack would incorporate certain peripheral input/output (I/O) devices such as a keyboard, a mouse, a display device, a floppy disk drive and a CD/DVD drive. However, these I/O devices are not used, except at certain critical installation points or for routine computer maintenance. Therefore, within the context of a large computer network environment, they are characterized as low-use devices.

When setting up these large installation computer networks it is desirable to minimize cost as well as the amount of space used. Consequently, to minimize the space used by the low-use devices, a keyboard/video/mouse (KVM) switch is sometimes incorporated.

Through the use of a KVM switch, only one set of keyboard, mouse and display devices are utilized by the rack of servers. FIG. 2 illustrates a conventional KVM system 50 comprising a rack 52 populated with a number of server computers 54–68, switch 70, keyboard 14, mouse 16 and display device 18. The KVM switch 70 is cabled to each of the server computers 54–68 and to keyboard 14, mouse 16 and display device 18. If a computer operator or technician subsequently needs to access one of the server computers 54–68 in rack 52, KVM switch 70 is utilized to associate keyboard 14, mouse 16 and display device 18 with the appropriate server computer 54–68. The computer operator or technician is then able to use the keyboard 14, mouse 16, and display device 18 to interact with the appropriate server computer 54–68. However, due to the high cost of KVM switches and associated extensive cabling and the valuable rack space occupied, their utilization is less than desirable. Also note that the KVM system 50 does not address a solution for additional I/O such as the floppy drive 20 and CD/DVD drive 22 which is typically duplicated within each server 54–68 in rack 52.

Accordingly, what is needed is a low cost, space saving method and apparatus for providing I/O support for these and other types of systems. The present invention addresses such a need.

SUMMARY OF THE INVENTION

A first aspect of the present invention provides an apparatus for providing I/O support to a computer system. The apparatus comprises an I/O device and an internal control element coupled to the I/O device for relinquishing ownership of the I/O device from the apparatus to the computer system.

A second aspect of the present invention provides a method for providing I/O support to a computer system. The method comprises the steps of providing an apparatus wherein the apparatus includes an I/O device and an internal control element coupled to the I/O device and utilizing the internal control element to allow ownership of the I/O device to be relinquished from the apparatus to the computer system.

The use of the method and apparatus in accordance with the present invention saves space and money since expensive KVM switches, along with the accompanying I/O devices, are no longer needed to provide I/O support for computer networks.

DETAILED DESCRIPTION

The present invention relates to a method and apparatus for providing I/O support. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is disclosed in the context of a preferred embodiment. The preferred embodiment of the present invention is an apparatus for providing I/O support to a computer system and a method of use thereof. The apparatus in accordance with the present invention is an enhanced portable or notebook computer system (e.g. an enhanced IBM Thinkpad) that includes a low cost means for providing I/O support to another computer via a control mechanism located within the apparatus. The control mechanism allows the apparatus in accordance with the present invention to relinquish ownership of the I/O devices coupled thereto for the purpose of being used by another computer. Accordingly, through the use of the apparatus in accordance with the present invention, expensive KVM switches and cabling, along with the accompanying I/O devices, are no longer needed to provide I/O support for the computer networks.

Figure 1:
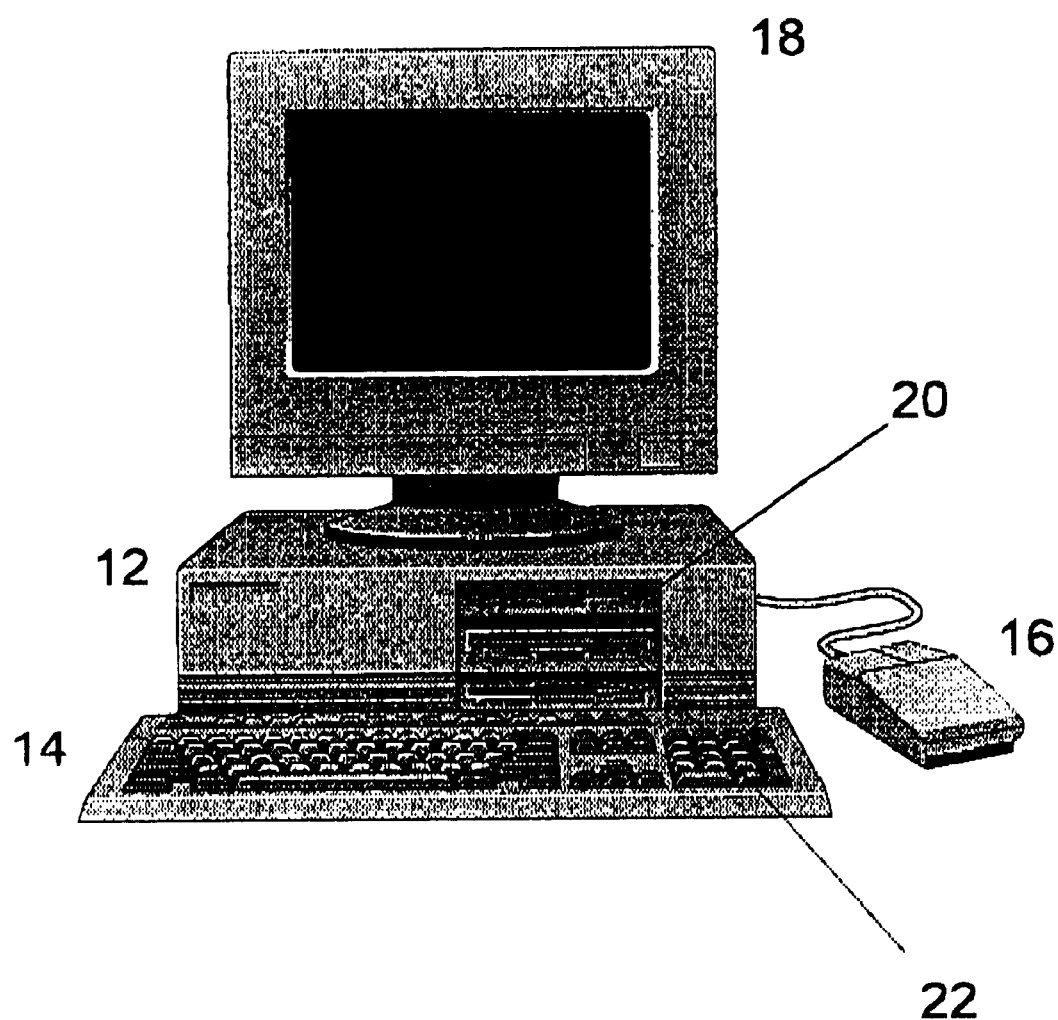
FIG. 1 illustrates a conventional computer system.
Figure 2:
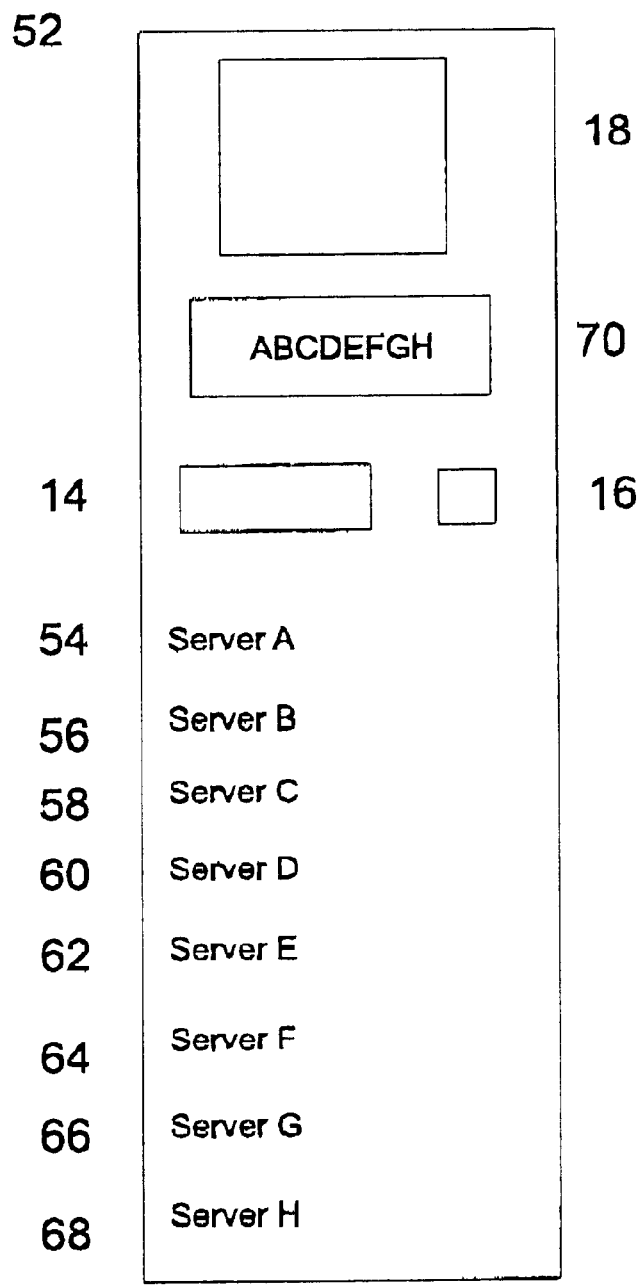
FIG. 2 illustrates a conventional KVM switching system.
Figure 3:
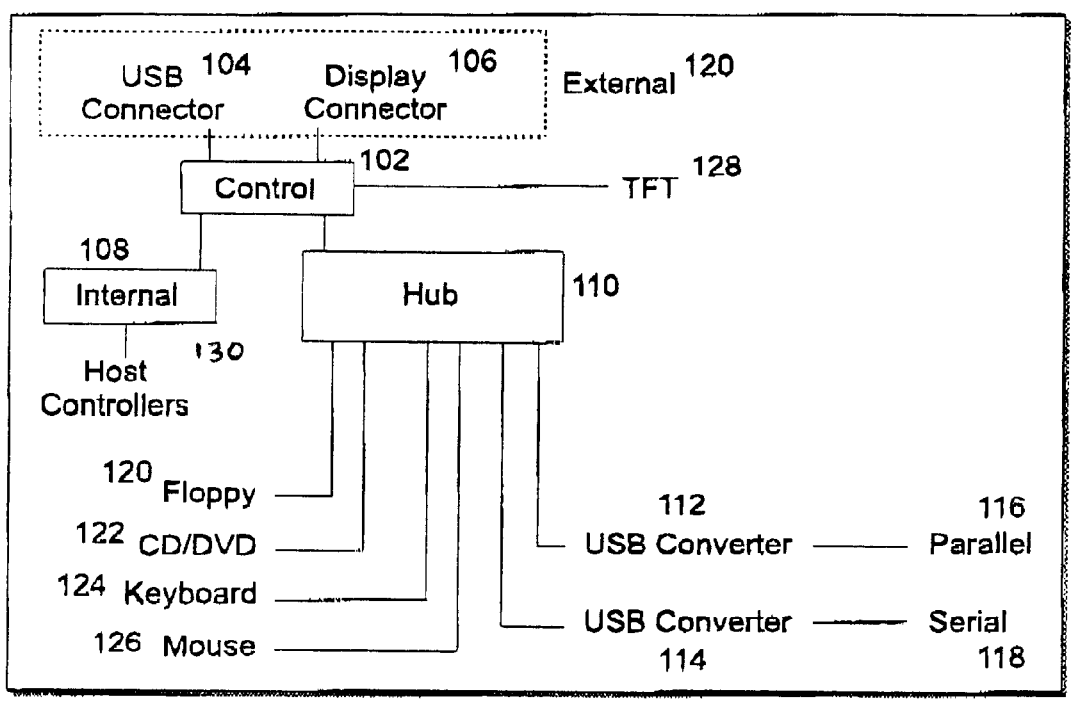
FIG. 3 shows an apparatus in accordance with the present invention.

For a further description of the apparatus in accordance with the present invention, please refer now to FIG. 3. FIG.

3 shows an apparatus 100 in accordance with the present invention. Apparatus 100 comprises control element 102, internal connection 108 coupled to host controllers 130, external connection 120 and display device 128. Display device 128 is preferable a thin film transistor (TFT) type display device. External connection 120 is further comprised of USB connector 104 and display device connector 106. Apparatus 100 is further comprised of hub 110 coupled to USB compatible devices floppy or diskette drive 120, CD or DVD drive 122, keyboard 124, mouse 126, parallel port 116 and serial port 118. Apparatus 100 also includes optional USB converter 112 and optional USB converter 114. Optional USB converter 112, 114 are shown to describe a methodology to bridge a USB subsystem to a potentially non-USB subsystem such as parallel port 116 and serial port 118. Preferably parallel port 116 and serial port 118 are native USB type devices thus eliminating the need for any converters 112, 114.

Control element 102 is coupled to internal connection 108 and external connection 120. Control element 102 is further connected to TFT 128 and hub 110. Control element 102 operates in one of two modes, internal or host mode and external or hub mode. In host mode control element 102 electrically couples internal connection 108 to TFT 128 and hub 110. In hub mode control element 102 electrically couples external connection 120 with TFT 128 and hub 110.

In alternate embodiments external connection 120 can be comprised of a single high speed serial connection such as IEEE 1394. Selection of a single high speed serial connection such as IEEE 1394 is based on such factors as commercial acceptance of the IEEE 1394 standard and the internal architecture of apparatus 100.

When operating in host mode, the apparatus 100 owns all of the I/O devices and operates in a normal fashion (i.e. as a typical notebook computer system). For the purposes of this application, an I/O device is owned by a computer if the I/O device is recognized and dedicated for use by the computer. Hence, when an I/O device, such as a visual display device, is owned by a designated computer, the visual display device only displays information related to the designated computer. Accordingly, in the host mode, the internal connection 108 recognizes the I/O devices TFT 128 and hub 110 and dedicates their use to apparatus 100.

In the hub mode,the apparatus 100 relinquishes ownership of the I/O devices and makes them available for use by another system. While apparatus 100 is operating in hub mode another system (not shown) cabled to external connection 120 could recognize and utilize the I/O devices TFT 128 and hub 110 via control 102 and further access floppy drive 120, CD/DVD drive 122, keyboard 124, mouse 126, parallel port 116 and serial port 118 via hub 110. Thus, the visual display device TFT 128 essentially becomes a stand-alo visual display device capable of receiving input signals from another system (not shown). And I/O devices floppy drive 120, CD/DVD drive 122, keyboard 124, mouse 126, parallel port 116 and serial port 118 essentially become dedicated "local" I/O devices for another system (not shown). Accordingly, a computer technician or other operator needs only the apparatus 100 and two cables (a USB cable and a display cable) to provide I/O support to a server computer.

Please note that in either mode of apparatus 100, host mode or hub mode, the apparatus 100 in accordance with the present invention retains its native computing capabilities including computer processor, memory, and networking functions.

Figure 4:
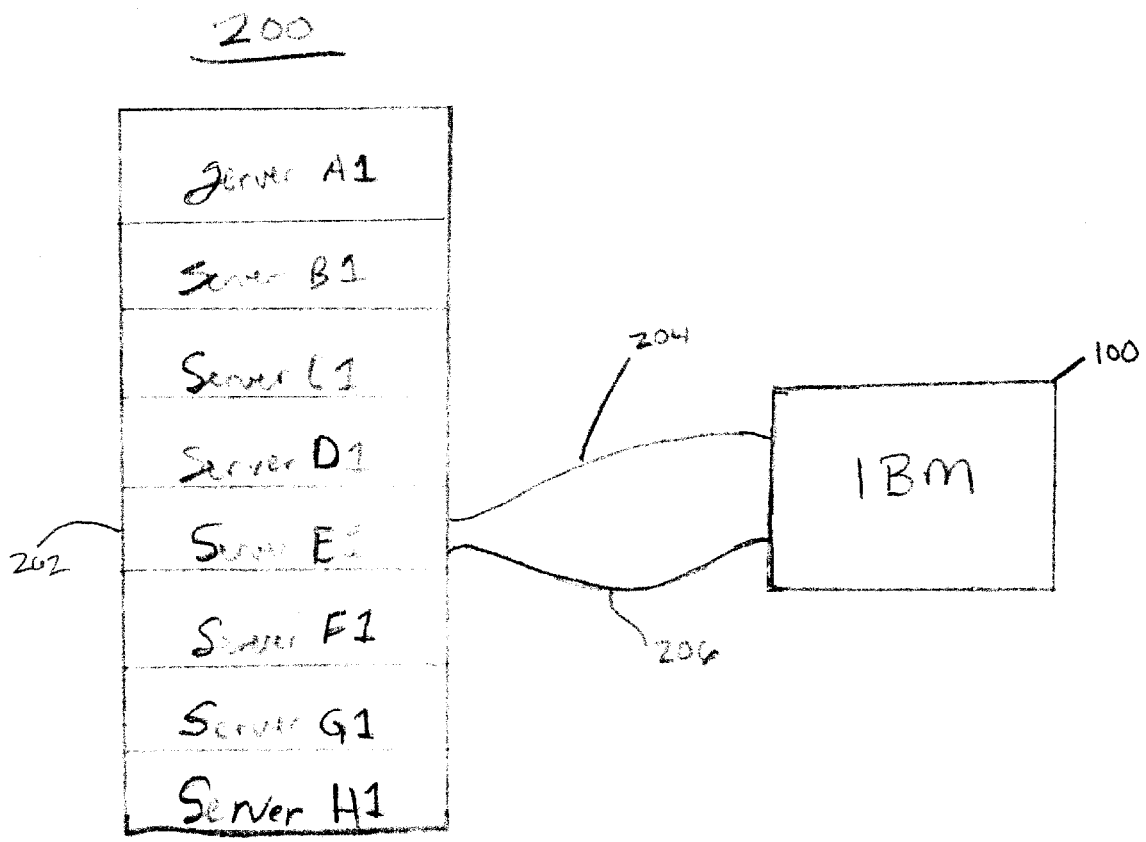
FIG. 4 is an illustration of the utilization of the apparatus 100 in accordance with the present invention.

FIG. 4 is an illustration of the utilization of the apparatus 100 in accordance with the present invention. FIG 4 shows a rack of servers 200 wherein one of the servers 202 is coupled to the apparatus 100 in accordance with the present invention via a USB cable 204 and a display cable 206. Consequently, a set of stand-alone I/O devices (and associated space within the rack) are not needed to provide I/O support for the rack of servers 200. In addition, a floppy drive and CD/DVD drive and certain other I/O devices are no longer, required to be included in each server in rack 200.

Although the preferred embodiment of the present invention is described in the context of being used with cable-type connectors, one of ordinary skill in the art will readily recognize that a variety of coupling means could be utilized. For example, the present invention could be implemented via a sufficiently high bandwidth infrared or wireless type coupling means while remaining within the spirit and scope of the present invention.

The switching of the apparatus 100 from hub mode to host mode or vice versa can be to done in a variety of ways. Preferably the mode changes are accomplished through some type of function key (Fn) sequence. For example, the key sequence Fn+F1 could be designated for host/hub mode changes. However, one of ordinary skill in the art will readily recognize that the host/hub mode change could be implemented in a variety of ways while remaining within the spirit and scope of the present invention.

Figure 5:
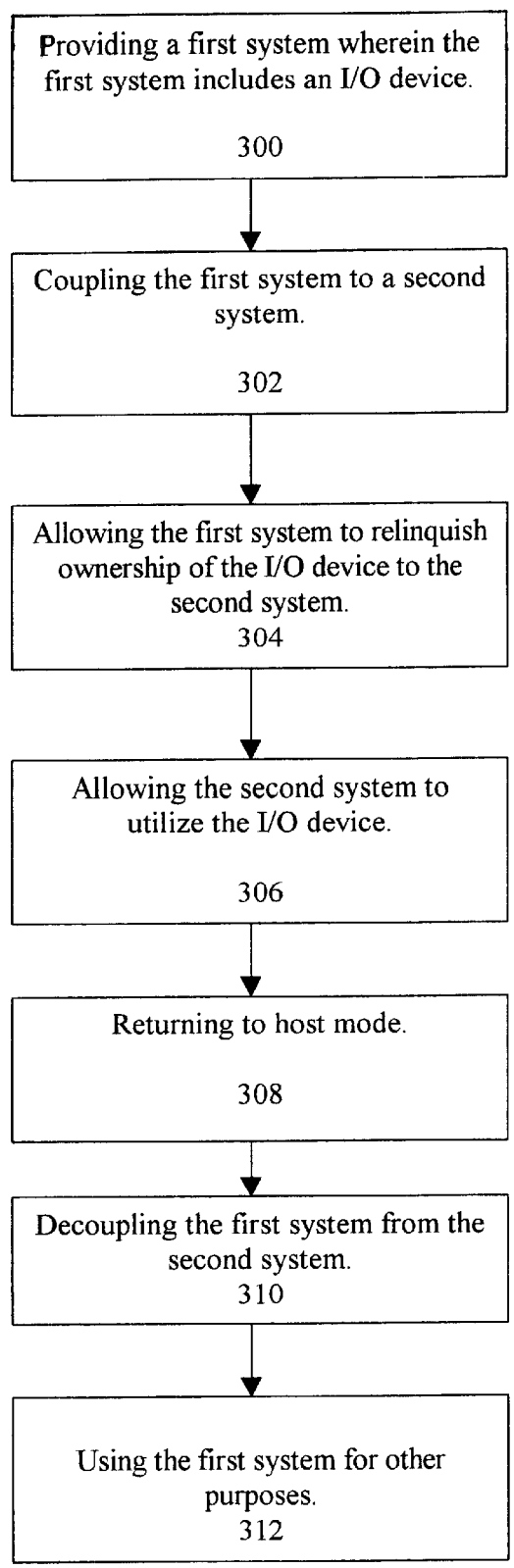
FIG. 5 is a flowchart of a method of using an apparatus in accordance with the present invention.

For a better understanding of the present invention, please refer to FIG. 5. FIG. 5 is a flowchart of a method of using an apparatus in accordance with the present invention. The method begins by providing a first system wherein the first system includes an I/O device, via step 300. Next, the apparatus in accordance with the present invention is coupled to a second system, via step 302. Next, ownership of the I/O device is relinquished from the first system to the second system, via step 304. Preferable, ownership of the I/O device is relinquished based upon a triggering event, i.e. a user interaction. Preferably, the triggering event is the performance of some type of function key sequence. The second system utilizes the I/O device as required, via step 306. The apparatus in accordance with the present invention is then switched back to host mode, via step 308. The apparatus of the present invention is then decoupled from the second system, via step 310. Finally, via step 312, the apparatus in accordance with the present invention is removed, potentially for other subsequent uses.

Although the above-outlined description contemplates utilizing the apparatus in accordance with the present invention as a means for providing I/O support to a rack of server computers, the scope of the implementation of the present invention is not limited to server computer support. The apparatus in accordance with the present invention could also be employed to provide I/O support for a single computer system such as a typical desk-top or desk-side computer system.

Many computer users today have an office computer system and a portable or laptop computer system. The apparatus 100 in accordance with the present invention can be used to improve the affordability of office systems as well. An office system which employs apparatus 100 in accordance with the present invention can be deployed at a significantly reduced cost by eliminating potentially redundant keyboard, mouse, display, floppy drive, CD/DVD drive, etc. devices.

Figure 6:
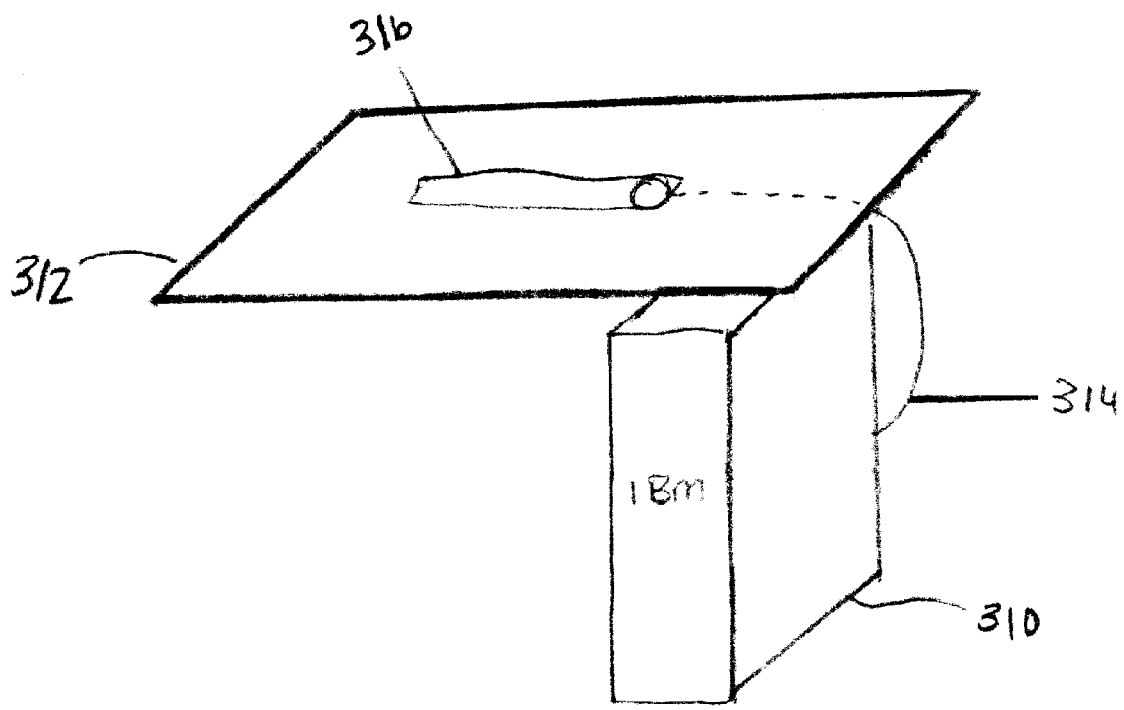
FIG. 6 is an illustration of the utilization of the apparatus in accordance with the present invention wherein the apparatus provides I/O support for a single computer system.

FIG. 6 is an illustration of the utilization of the apparatus in accordance with the present invention wherein the apparatus provides I/O support for a single computer system 310. The computer system 310 is preferably coupled to a dock 312 via coupling device 314. Preferable, coupling device 314 comprises a cable. Dock 312 further comprises docking port 316. Docking port 316 is compatible with apparatus 100. Accordingly, once apparatus 100 is coupled to docking port 316, the I/O devices that are recognized by the apparatus 100, are now capable of being recognized by the computer system 310. Thus, a conventional keyborad mouse, stand-alone monitor, floppy drive, CD/DVD drive, etc. are no longer required to be provided as integral elements of computer system 310.

The apparatus in accordance with the present invention provides a low cost means for providing I/O support to another system via a switching mechanism located within the apparatus. The switching mechanism allows the apparatus in accordance with the present invention to relinquish ownership of the I/O devices coupled thereto for the purpose of being used by the other system. The use of the apparatus in accordance with the present invention saves space and money since the expensive KVM switches and associated cables, along with accompanying I/O devices, are no longer needed to provide I/O support for computer networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit of the appended claims.

What is claimed is:

1. An apparatus in a host computer system for enabling the host computer system to provide I/O support to a second computer system, wherein the host computer system includes a plurality of host controllers and a plurality of I/O devices, the apparatus comprising:
   a first connecting port for directly coupling the second computer system to the host computer system;
   an internal control element coupled to the plurality of I/O devices and to the first connecting port, wherein the plurality of I/O devices comprises a display and a keyboard; and
   a second connecting port for coupling the plurality of host controllers in the host computer system to the internal control element,
   wherein the internal control element regulates control of the plurality of I/O devices by the second computer system and the host computer system via the first and second connecting ports respectively.

2. The apparatus of claim 1 wherein the apparatus further includes a hub coupled to the internal control element.

3. The apparatus of claim 1 wherein the first connecting port comprises a universal serial bus connector.

4. The apparatus of claim 3 wherein the first connecting port further comprises a display device connector.

5. The apparatus of claim 1 wherein the first connecting port for coupling the second computer system directly to the host computer system comprises a an infra red type connector.

6. The apparatus of claim 1 wherein the first connecting port for coupling the second computer system directly to the host computer system comprises a wireless type connector.

7. The apparatus of claim 4 wherein the internal control element further includes means for coupling a visual display device to the apparatus.

8. The apparatus of claim 5 wherein the visual display device is a thin film transistor-type visual display device.

9. The apparatus of claim 2 wherein the apparatus is capable of operating in one of at least two modes.

10. The apparatus of claim 9 wherein the at least two modes comprise a host mode and a hub mode.

11. The apparatus of claim 10 wherein the internal control element is capable of switching the at least two modes.

12. The apparatus of claim 11 wherein if the apparatus is operating in the host mode, the plurality of I/O devices are controlled by the host computer system.

13. The apparatus of claim 12 wherein if the apparatus is operating in the hub mode, the plurality of I/O devices are controlled by the second computer system.

14. The apparatus of claim 13 wherein the second computer system comprises at least one computer.

15. An apparatus in a host computer system for enabling the host computer system to provide I/O support to a second computer system, wherein the host computer system includes a plurality of host controllers and a plurality of I/O devices, the apparatus comprising:
    a first connecting port for directly coupling the second computer system to the host computer system;
    a hub coupled to the plurality of I/O devices, wherein the plurality of I/O devices comprises a display and a keyboard;
    an internal control element coupled to the hub and to the first connecting port; and
    a second connecting port for coupling the plurality of host controllers in the host computer system to the internal control element,
    wherein the internal control element regulates control of the plurality of I/O devices by the second computer system and the host computer system via the first and second connecting ports respectively.

16. The apparatus of claim 15 wherein the internal control element further includes means for coupling a visual display device to the apparatus.

17. The apparatus of claim 16 wherein the visual display device is a thin film transistor-type visual display device.

18. The apparatus of claim 15 wherein the apparatus is capable of operating in one of at least two modes.

19. The apparatus of claim 18 wherein the at least two modes comprise a host mode and a hub mode.

20. The apparatus of claim 19 wherein the internal control element is capable of switching the at least two modes.

21. The apparatus of claim 20 wherein if the apparatus is operating in the host mode, the plurality of I/O devices are controlled by the host computer system.

22. The apparatus of claim 21 wherein if the apparatus is operating in the hub mode, the plurality of I/O devices are controlled by the second computer system.

23. The apparatus of claim 22 wherein the second computer system comprises at least one computer.

24. An apparatus in a host computer system for enabling the host computer system to provide I/O support to a second computer system, wherein the host computer system includes a plurality of host controllers and a plurality of I/O device, the apparatus comprising:
    a hub coupled to the plurality of I/O devices, wherein the plurality of I/O devices comprises a display and a keyboard;
    an internal control element coupled to the hub, the internal control element including means for switching the apparatus to one of at least two operational modes, the at least two operational modes comprising a host mode and a hub mode wherein if the apparatus is operating in the host mode, the plurality of I/O devices are controlled by the host computer system and if the apparatus is operating in the hub mode, the plurality of I/O devices are controlled by the second computer system;

a first connecting port coupled to the internal control element for coupling the second computer system directly to the host computer system, the first connecting port comprising a universal serial bus connector and a display device connector; and a second connecting port coupled to the internal control element and to the plurality of host controllers in the host computer system for coupling the host controllers to the plurality of I/O devices.

25. A method of providing I/O support by a host computer system to a second computer system, wherein the host computer system includes a plurality of host controllers and a plurality of I/O devices, the method comprising the steps of:

a) directly coupling the second computer system to the host computer system via first connecting port in the computer system;

b) providing an internal control element in the host computer system coupled to the first connecting port and to the plurality of I/O devices, wherein the plurality of I/O devices comprises a display and a keyboard;

c) coupling the plurality of host controllers in the host computer system to the internal control element via a second connecting port in the computer system; and d) utilizing the internal control element to regulate control of the plurality of I/O devices by the second computer system and the host computer system via the first and second connecting ports respectively.

26. The method of claim 25 wherein the host computer system further comprises a hub coupled to the plurality of I/O devices and to the internal control element.

27. The method of claim 26 wherein the host computer is capable of operating in one of at least two operational modes.

28. The method of claim 27 wherein the internal control element is capable of switching the host computer system to one of the at least two operational modes.

29. The method of claim 28 wherein step b) further comprises:

b1) coupling the internal control element directly to the second computer system; and b2) utilizing the internal control element to switch the host computer system to one of the at least two operational modes.

30. The method of claim 29 wherein the at least two operational modes comprise a host mode and a hub mode.

31. The method of claim 30 wherein step b2) further comprises:

b2i) switching to the host mode; and b2ii) allowing the host computer system to control the plurality of I/O devices.

32. The method of claim 31 wherein step b2i) is provided in response to an interaction with the host computer system.

33. The method of claim 30 wherein step b2) further comprises:

b2i) switching to the hub mode; and b2ii) allowing the second computer system to control the plurality of I/O devices.

34. The method of claim 33 wherein step b2i) is provided in response to an interaction with the host computer system.

35. A processing system for providing I/O support to one of a plurality of network server computers, wherein the processing system includes a plurality of host controllers and a plurality of I/O devices, the processing system comprising:

a first connecting port for directly coupling the one network server computer to the processing system;

an internal control element coupled to the plurality of I/O devices and to the first connecting port, wherein the plurality of I/O devices comprises a display and a keyboard; and a second connecting port for coupling the plurality of host controllers in the processing system to the internal control element, wherein the internal control element regulates control of the plurality of I/O devices by the one network server computer and the processing system via the first and second connecting ports respectively.

36. The processing system of claim 35 wherein the processing system further includes a hub coupled to the internal control element.

37. The processing system of claim 36 wherein the first connecting port comprises a universal serial bus connector and a display device connector.

38. The processing system of claim 36 wherein the first connecting port for coupling the processing system directly to the one network server computer comprises an infra red type connector.

39. The processing system of claim 36 wherein the first connecting port for coupling the processing system directly to the one network server computer comprises a wireless type connector.

40. The processing system of claim 36 wherein the processing system is capable of operating in one of at least two modes.

41. The processing system of claim 40 wherein the at least two modes comprise a host mode and a hub mode.

42. The processing system of claim 41 wherein the internal control element is capable of switching the at least two modes.

43. The processing system of claim 42 wherein if the processing system is operating in the host mode, the plurality of I/O devices are controlled by the processing system.

44. The processing system of claim 43 wherein if the processing system is operating in the hub mode, the plurality of I/O devices are controlled by the one network server computer.

* * * * *